US010575195B2

(12) United States Patent
Carswell

(10) Patent No.: US 10,575,195 B2
(45) Date of Patent: Feb. 25, 2020

(54) SYSTEMS AND METHODS FOR ENHANCED WIRELESS COMMUNICATION ON AIRCRAFT

(71) Applicant: Systems and Software Enterprises, LLC, Brea, CA (US)

(72) Inventor: Samuel Allen Carswell, Brea, CA (US)

(73) Assignee: SYSTEMS AND SOFTWARE ENTERPRISES, LLC, Brea, CA (US)

(*) Notice: Subject to any disclaimer, the term of this patent is extended or adjusted under 35 U.S.C. 154(b) by 0 days.

(21) Appl. No.: 16/057,405

(22) Filed: Aug. 7, 2018

(65) Prior Publication Data
US 2019/0045382 A1 Feb. 7, 2019

Related U.S. Application Data

(60) Provisional application No. 62/542,183, filed on Aug. 7, 2017.

(51) Int. Cl.
H04W 24/04 (2009.01)
H04L 12/24 (2006.01)
H04W 4/42 (2018.01)
H04W 4/38 (2018.01)
H04W 4/48 (2018.01)
H04W 24/02 (2009.01)
H04W 84/00 (2009.01)
(Continued)

(52) U.S. Cl.
CPC ......... H04W 24/04 (2013.01); H04L 41/0668 (2013.01); H04W 4/38 (2018.02); H04W 4/42 (2018.02); H04W 4/48 (2018.02); H04W 24/02 (2013.01); H04W 24/08 (2013.01); H04W 84/005 (2013.01); H04W 84/06 (2013.01)

(58) Field of Classification Search
CPC ....... H04W 4/02; H04W 36/08; H04W 36/16; H04W 36/32; H04W 4/021; H04W 4/023; H04W 88/08
See application file for complete search history.

(56) References Cited

U.S. PATENT DOCUMENTS 8,982,784 B2 3/2015 Mueller et al.
9,764,842 B2 9/2017 Woicekowski
2004/0098745 A1 5/2004 Marston et al.
(Continued)

FOREIGN PATENT DOCUMENTS

JP 4781857 B2 9/2011
WO 2017176748 10/2017

OTHER PUBLICATIONS

International Search Report and Written Opinion for Application No. PCT/US2018/045613, dated Nov. 27, 2018; 12 pgs.

Primary Examiner — Kwasi Karikari
(74) Attorney, Agent, or Firm — Umberg Zipser LLP

(57) ABSTRACT

Systems and methods for wireless detection of a status of component within a vehicle are described that utilize a single connection or single point of connection to access the status of each component. A plurality of modules each having a wireless radio and two discrete electrical inputs can be provided, with each of the modules monitoring at least one component. Each module can be configured to switch a configuration of its wireless radio from a client to a wireless access point. A radio of one of the module can be dynamically configured to be the wireless access point, with the remaining ones of the modules being configured to connect to the wireless access point.

18 Claims, 3 Drawing Sheets

(51) Int. Cl.
*H04W 84/06* (2009.01)
*H04W 24/08* (2009.01)

(56) References Cited

U.S. PATENT DOCUMENTS

| | | |
|---|---|---|
| 2009/0176475 A1 | 7/2009 | Salkini et al. |
| 2011/0299470 A1 | 12/2011 | Muller et al. |
| 2015/0241209 A1 | 8/2015 | Jouper et al. |
| 2016/0109280 A1* | 4/2016 | Tiu ................... G01D 7/00 702/173 |
| 2016/0227600 A1 | 8/2016 | Shedletsky et al. |
| 2016/0332729 A1 | 11/2016 | Woicekowski |
| 2017/0026809 A1 | 1/2017 | Gouverneur |
| 2017/0233098 A1 | 8/2017 | Gerard |
| 2017/0283086 A1 | 10/2017 | Garing et al. |
| 2017/0310543 A1* | 10/2017 | Greig ................ H04B 7/18506 |

\* cited by examiner

SYSTEMS AND METHODS FOR ENHANCED WIRELESS COMMUNICATION ON AIRCRAFT

This application claims priority to U.S. Provisional Application No. 62/542,183, filed Aug. 7, 2017. This and all other extrinsic materials identified herein are incorporated by reference in their entirety to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is wireless communication within for aircraft and other vehicles.

BACKGROUND

The background description includes information that may be useful in understanding the present invention. It is not an admission that any of the information provided herein is prior art or relevant to the presently claimed invention, or that any publication specifically or implicitly referenced is prior art.

Wireless communication in aircraft and other vehicles typically maximizes re-use of the terrestrial standards and best practices developed to solve the complexities faced by laptop computer clients connecting to a Wireless Access Point (WAP) in buildings. However, terrestrial solutions are generally insufficient since aircraft transmissions must adhere to aircraft regulations (e.g., FAA, EASA), multiple country regulations (e.g., FCC, ETSI), airframer requirements (e.g., Boeing, Airbus), and airline policies. Each airline has a different mix of requirements and solutions matching their set of country flag, aircraft type and countries in their routes, which aren't accounted for in terrestrial standards.

Thus, there is still a need for systems and methods for systems and methods for wireless communication in aircraft that account for varying regulations depending on area of use, for example.

SUMMARY OF THE INVENTION

The present invention provides apparatus, systems, and methods for wirelessly detecting a status of a plurality of components within a vehicle using a single connection. Although the term "in-flight entertainment" and "aircraft" may be used herein, the contemplated systems and methods could readily be used in busses, trains, boats, and other vehicles.

Contemplated systems include a plurality of modules, each having a wireless radio and two discrete electrical inputs. Each of the modules can also include or be connected to one or more sensors to provide status information of a component, for example. Preferably, each of the modules is associated with a component of the same type.

It is further contemplated that each module is configured to switch a configuration of its wireless radio between a wireless access point (WAP) and a client. The system can be configured to utilize a processor and preprogrammed routines or software to dynamically configure one of the wireless radios of the modules to act as the WAP and configure the wireless radios of the remaining modules to connect to the WAP as clients.

In some contemplated embodiments, one of the discrete electrical inputs of each module is connected to a remote switch, such that actuation of the remote switch will disable the wireless radio of each module.

In one aspect, methods for wirelessly detecting a status of a plurality of components within a vehicle using a single connection are also contemplated. Such methods may include, for example, receiving a status information from each of a plurality of modules, where each module is associated with a component of the same type. Each of the modules preferably comprises a wireless radio and two discrete electrical inputs.

A configuration of the wireless radio of a first one of the plurality of modules can be switched using a processor from a client to a WAP. The wireless radios of the remaining ones of the plurality of modules can then be configured to connect with the WAP as clients, and thereby connect all of the modules via the same WAP. In this manner, a crew member's device can connect with the WAP to thereby obtain a status of each component associated with each of the plurality of modules.

Exemplary components include, for example, an overhead bin and a service cart. However, other components are contemplated where periodic status may be useful and could include, for example, bathroom components, status of seat belts, seat recline, tray tables, in-flight entertainment devices, and so forth.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
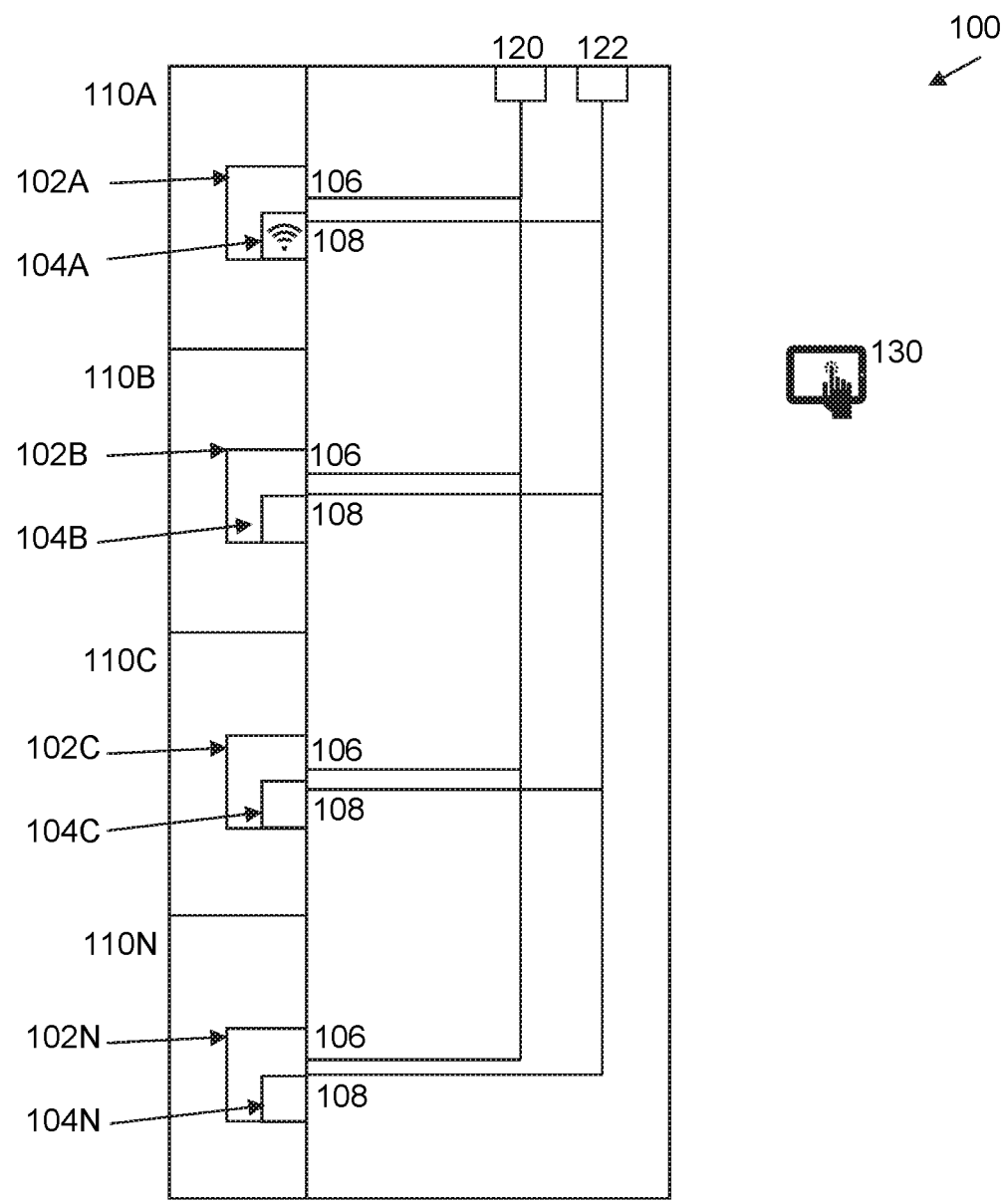
FIG. 1 illustrates a diagram of one embodiment of a system for wirelessly monitoring a plurality of components using a single connection.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Although the inventive concepts are discussed below with respect to overhead bins or storage space having bin modules that are configured to wirelessly communicate with crew Personal Electronic Devices (PEDs) using IEEE 802.11, the concepts discussed herein are equally applicable to other applications in any configuration or number of WAPs, frequency bands, wireless protocols, Line Replaceable Units (LRUs) and/or PEDs, for example. As used herein, an "LRU" is the smallest piece of avionic electronics that can be replaced by a maintenance technician on an aircraft.

In the instant example, an overhead bin's remaining available space can be wirelessly reported to one or more PEDs to allow crew to visualize the available bag space, for example, and provide for more efficient boarding of the aircraft.

The inventive subject matter discussed herein is a protocol that advantageously: (1) lowers airline inventory costs since one module can be universally installed on any aircraft in the fleet regardless of the aircraft's configuration; (2) enables a single wireless module to maintain requirements compliance in multiple aircraft configurations and throughout multiple aircraft operational scenarios; (3) lowers vendor manufacturing costs since the module only needs one WiFi radio; (4) maintains WiFi spectrum use to a single wireless band, and (5) lowers avionic vendor development costs since only one module must be developed and qualified.

FIG. 1 illustrates one embodiment of a system 100 for wirelessly detecting a status of a plurality of components 110A-110N within a vehicle using a single connection. System 100 can include a plurality of modules 102A-102N, each of which is disposed within or configured to monitor one of the plurality of components 110A-110N. It is preferred that each of the components 110A-110N are of the same type (e.g., overhead bins, for example).

Each of the modules 102A-102N can include or be connected with one or more sensors such that a status of each of the components 110A-110N can be monitored and reported.

Preferably, each of the modules 102A-102N comprises a wireless radio 104 and two discrete electrical inputs 106 and 108. Each of the modules 102A-102N is configured to switch a configuration of its wireless radio 104A-104N between a WAP and a client, depending on the system's needs and regulations.

System 100 preferably comprises a processor that dynamically configures a wireless radio 104A of one of the modules 102A to be the WAP using a set of instructions, and configures the wireless radios 104B-104N of the remaining modules 102B-102N to connect to the WAP as clients.

In some contemplated embodiments, one of the discrete electrical inputs 106 of each module 102A-102N is connected to a remote switch 120 configured to disable the wireless radio 104A-104N of each module 102A-102N when the switch 120 is actuated. This may occur by the switch 120 interrupting power to the wireless radio 104A-104N of each module 102A-102N when actuated, for example.

In such embodiments, a pilot or crew member can thereby disable the wireless radios 104A-104N of the modules 102A-102N quickly and simultaneously from a single point, such as when required by regulations or policy. The switch 120 could be a simple toggle switch, similar to a light switch, or could be a digital representation of a switch via a graphic user interface, for example.

Thus, for example, an aircraft can include a plurality of overhead bins 110A-110N, each of which can comprise a module 102A-102N that may be disposed within one of the plurality of overhead bins 110A-110N, coupled to one of the plurality of overhead bins 110A-110N, or otherwise disposed to monitor a status of one or more of the plurality of overhead bins 110A-110N. In this example, the components 110A-110N are the overhead bins.

Preferably, each of the modules 102A-102N is configured to compute a remaining space of its associated overhead bin 110A-110N and/or report whether the overhead bin 110A-110N is full. Each of the modules 102A-102N could comprise one or more sensors, electronics, software, wireless radio 104, and two discrete electrical inputs 106 and 108.

Most commercial PEDs can only connect to one WAP at any instance, and round-robin establishment of one connection to each of the wireless radios 104A-104N of the plurality of modules would perform poorly. This is especially true with a large number of modules (e.g., 50 or more). Using system 100, for example, a crew member's PED 130 can establish a single stable connection with a WAP 104A of one 102A of the plurality of modules, thus negating the need for multiple connections to different WAPs of the modules 102A-102N. Thus, one of the modules 102A can configure its wireless radio 104A as a WAP also referred to herein as a Bin-WAP-Server. The remaining modules 102B-102N and the PED 130 can therefore be clients of the WAP of that wireless radio 104A. In this manner, module 102A can thereby aggregate status information from the connected modules 102B-102N and the status information associated with its own overhead bin 110A. One or more PEDs 130 may then be able to independently gather data from the module 102A via the WAP of radio 104A and display the entire aircraft's overhead bin status with each only requiring a single connection.

Figure 2:
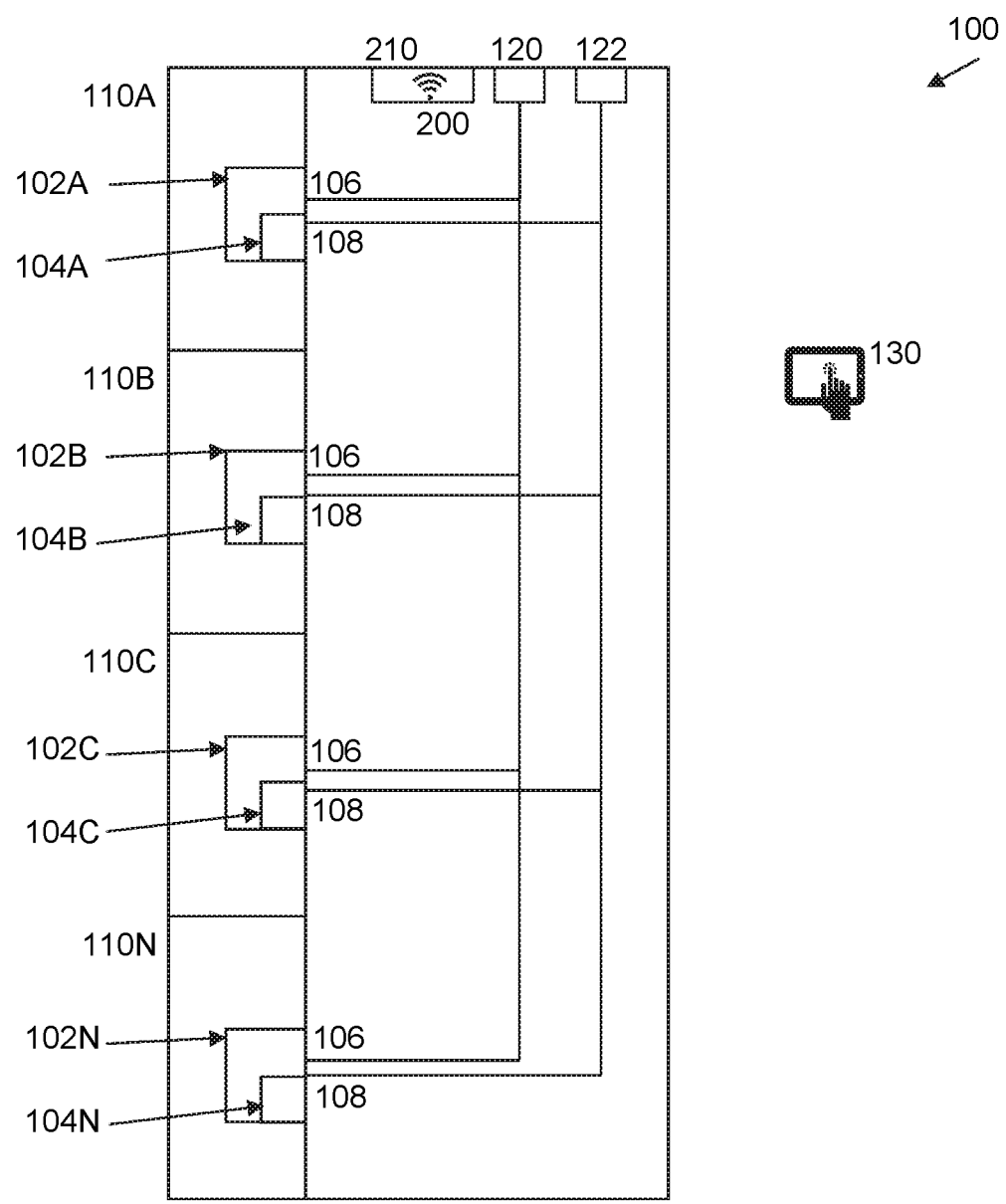
FIG. 2 illustrates a diagram of the system of FIG. 1 with an aircraft's wireless network available.

In some embodiments such as shown in FIG. 2, system 100 can be configured such that module 102A with the wireless radio 104A acting as a WAP is dynamically switched from acting as a WAP to a client upon detection of a distinct wireless network 200 of an aircraft server 210. Thus, for example, the aircraft may comprise one or more general purpose servers that could establish connections to crew PEDs 130 for sales transactions and other cabin functions, for example. The servers could also be used for storage of media files for transfer or streaming to in-flight entertainment or passenger devices, for example. Likewise, system 100 can be configured to dynamically switch where the radio 104A acts as a client to acting as a WAP.

It is contemplated that the other discrete electrical input 108 of each module 102A-102N is connected to a second remote switch 122 configured to cause each of the wireless radios 104A-104N of the modules 102A-102N to configure themselves as clients and connect to a wireless network 200 of an aircraft server 210 distinct from the plurality of modules 102A-102N. The wireless network 200 could be a network associated with a headend or other server 210 of an aircraft, which could be for exclusive use of the flight crew, for example, and separate from a passenger-accessible wireless network. It is further contemplated that actuation of the switch 122 can cause one of the wireless radios 104A to be dynamically configured as a WAP such as described above.

In such configurations, the crew PEDs 130 generally already have established a connection to the distinct wireless network 200 of the aircraft and generally cannot be modified to now connect with a WAP of one of the plurality of modules. It is contemplated that software can be installed on the aircraft server 210 such that the wireless network 200 associated with the server 210 can emulate the functionality of the WAP of one of the plurality of modules 102A-102N. In such embodiments, it is further contemplated that each of the wireless radios 104A-104N of the modules 102A-102N can be automatically configured to connect with the distinct wireless network 200 of the aircraft server 210.

In alternative embodiments, the switch 122 can permit crew members to disable both the wireless network 200 (Aircraft-WAP-Server) and the radios 104A-104N of the modules 102A-102N, if required by regulations or policy, when actuated.

In other embodiments, the above configurations can be combined to permit situations where the distinct aircraft network 200 is used, and situations where the WAP of the module is used simultaneously with, or instead of, the distinct aircraft network 200. This may be common as most aircraft are configured to disable one or more of their wireless radios or reconfigure the radios when the aircraft flies below 10,000 feet or enters into a country having a new or different regulatory domain. As a result, such disabling interrupts or removes the Wi-Fi link to crew PEDs 130.

Since the crew wants to continue to use their PEDs 130 to manage overhead bins or other components of the aircraft, it is contemplated that system 100 can be configured to detect a presence or loss of a wireless network 200 of the aircraft, and dynamic reconfigure one or more of the radios 104A-104N of the modules 102A-102N to account for the presence or loss of the wireless network 200.

For example, when the aircraft's wireless network 200 is detected, system 100 can be configured to dynamically configure each of the wireless radios 104A-104N as clients to connect with the aircraft's network 200. In situations where the aircraft's wireless network 200 is not detected or lost, such as shown in FIG. 1, system 100 dynamically configure one wireless radio 104A of the plurality of modules 102A-102N to act as a WAP. It is further contemplated that the PED 130 of the crew can establish a link to either network, depending upon which is available. To maintain communication requirements compliance, system 100 may change Industrial, Scientific, Medical (ISM) bands and/or channels. System 100 may even be configured to permit the establishment of connections between the modules 102A-102N and a land-based network, for example.

In other embodiments, it is contemplated that system 100 can dynamically configure another one of the wireless radios 104B of the modules 102B to be the new WAP and configure the wireless radios 104A and 104C-104N of the remaining modules to connect to the new WAP as clients, upon detection of a failure of the WAP.

Figure 3:
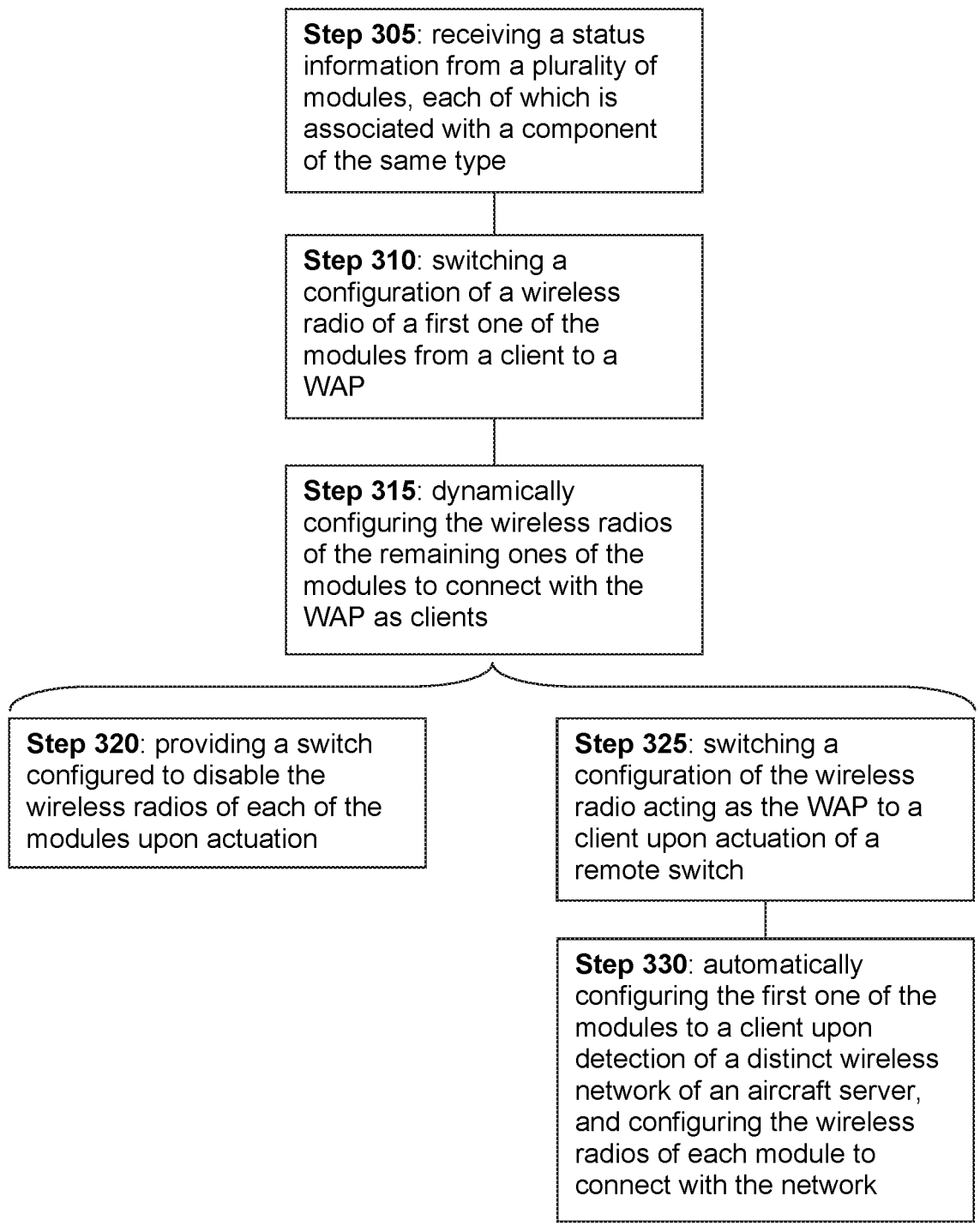
FIG. 3 illustrates a flowchart of one embodiment of a method for wirelessly monitoring a plurality of components using a single connection.

FIG. 3 illustrates one embodiment of a method for wirelessly detecting a status of a plurality of components within a vehicle using a single connection. In step 305, a status information can be received from a plurality of modules, each of which is associated with a component of the same type. Such components can include, for example, overhead bins, service carts, bathroom components, or other components of an aircraft or other vehicle including those described above.

Preferably, each of the modules comprises a wireless radio and two discrete electrical inputs.

In step 310, a configuration of the wireless radio of a first one of the modules can be switched from a client to a WAP. In step 315, the wireless radios of the remaining ones of the modules can be automatically configured to connect with the WAP as clients, by using a processor and a preprogrammed routine to dynamically configure each wireless radio.

In step 320, the wireless radios of each of the modules can be automatically disabled upon actuation of a remote switch connected with one of the discrete electrical inputs of each module.

In step 325, the configuration of the wireless radio acting as the WAP can be switched to a client upon actuation of a remote switch connected with one of the discrete electrical inputs of the first one of the modules.

Optionally, in step 330, the first one of the modules can be automatically configured to a client upon detection of a distinct wireless network of an aircraft server, and the wireless radios of each module can be automatically connected with the distinct wireless network of the aircraft server.

It is further contemplated that another one of the wireless radios of the modules can be configured to be the new WAP and the wireless radios of the remaining modules can be configured to connect to the new WAP as clients, upon detection of a failure of the WAP.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for wirelessly detecting a status of a plurality of components within a vehicle using a single connection, comprising:
    a plurality of modules coupled with one or more sensors, wherein each of the modules is associated with a component of the same type;
    wherein each of the modules comprises a wireless radio and two discrete electrical inputs;
    wherein each of the modules is configured to switch a configuration of its wireless radio between a wireless access point (WAP) and a client; and
    wherein the system further comprises a processor and a set of instructions to dynamically configure a wireless radio of one of the modules to be the WAP and configure the wireless radios of the remaining modules to connect to the WAP as clients, and wherein the processor dynamically configures one of the modules to be the WAP when a distinct wireless network of an aircraft server is not detected.

2. A system for wirelessly detecting a status of a plurality of components within a vehicle using a single connection, comprising:
    a plurality of modules coupled with one or more sensors, wherein each of the modules is associated with a component of the same type;
    wherein each of the modules comprises a wireless radio and two discrete electrical inputs;
    wherein each of the modules is configured to switch a configuration of its wireless radio between a wireless access point (WAP) and a client,
    wherein the system further comprises a processor and a set of instructions to dynamically configure a wireless radio of one of the modules to be the WAP and configure the wireless radios of the remaining modules to connect to the WAP as clients; and
    wherein one of the discrete electrical inputs of each module is connected to a remote switch configured to disable the wireless radio of each module when actuated.

3. The system of claim 2, wherein the other of the discrete electrical inputs of each module is connected to a second remote switch configured to cause the wireless radio of each module to configure itself as a client and connect to a wireless network of an aircraft server distinct from the plurality of modules.

4. A system for wirelessly detecting a status of a plurality of components within a vehicle using a single connection, comprising:
    a plurality of modules coupled with one or more sensors, wherein each of the modules is associated with a component of the same type;
    wherein each of the modules comprises a wireless radio and two discrete electrical inputs;
    wherein each of the modules is configured to switch a configuration of its wireless radio between a wireless access point (WAP) and a client,
    wherein the system further comprises a processor and a set of instructions to dynamically configure a wireless radio of one of the modules to be the WAP and configure the wireless radios of the remaining modules to connect to the WAP as clients; and
    wherein one of the discrete electrical inputs of each module is connected to a remote switch configured to interrupt power to the wireless radio of each module when actuated.

5. A system for wirelessly detecting a status of a plurality of components within a vehicle using a single connection, comprising:
    a plurality of modules coupled with one or more sensors, wherein each of the modules is associated with a component of the same type;
    wherein each of the modules comprises a wireless radio and two discrete electrical inputs;
    wherein each of the modules is configured to switch a configuration of its wireless radio between a wireless access point (WAP) and a client;
    wherein the system further comprises a processor and a set of instructions to dynamically configure a wireless radio of one of the modules to be the WAP and configure the wireless radios of the remaining modules to connect to the WAP as clients; and
    wherein the processor is further configured to automatically switch the module acting as the WAP to a client upon detection of a distinct wireless network of an aircraft server.

6. The system of claim 5, wherein the processor is further configured to automatically connect the wireless radios of each module with the distinct wireless network of the aircraft server.

7. The system of claim 1, wherein the system is further configured to dynamically configure another one of the wireless radios of the modules to be the new WAP and configure the wireless radios of the remaining modules to connect to the new WAP as clients, upon detection of a failure of the WAP.

8. The system of claim 1, wherein the component is an overhead bin, and the plurality of modules each comprise a device for monitoring and reporting a status of the overhead bin.

9. The system of claim 8, wherein each of the modules is disposed within an overhead bin.

10. The system of claim 1, wherein the component is a service cart.

11. A method for wirelessly detecting a status of a plurality of components within a vehicle using a single connection, comprising:
    receiving a status information from a plurality of modules, each of which is associated with a component of the same type;
    wherein each of the modules comprises a wireless radio and two discrete electrical inputs;

switching a configuration of the wireless radio of a first one of the modules from a client to a wireless access point (WAP); and automatically configuring the wireless radios of the remaining ones of the modules to connect with the WAP as clients, by using a processor and a set of instructions to dynamically configure each wireless radio, and automatically configuring the first one of the modules to a client upon detection of a distinct wireless network of an aircraft server.

12. A method for wirelessly detecting a status of a plurality of components within a vehicle using a single connection comprising:

receiving a status information from a plurality of modules, each of which is associated with a component of the same type;

wherein each of the modules comprises a wireless radio and two discrete electrical inputs;

switching a configuration of the wireless radio of a first one of the modules from a client to a wireless access point (WAP);

automatically configuring the wireless radios of the remaining ones of the modules to connect with the WAP as clients, by using a processor and a set of instructions to dynamically configure each wireless radio; and automatically disabling the wireless radios of each of the modules upon actuation of a remote switch connected with one of the discrete electrical inputs of each module.

13. A method for wirelessly detecting a status of a plurality of components within a vehicle using a single connection, comprising:

receiving a status information from a plurality of modules, each of which is associated with a component of the same type;

wherein each of the modules comprises a wireless radio and two discrete electrical inputs;

switching a configuration of the wireless radio of a list one of the modules from a client to a wireless access point (WAP);

automatically configuring the wireless radios of the remaining ones of the modules to connect with the WAP as clients, by using a processor and a set of instructions to dynamically configure each wireless radio; and switching the configuration of the wireless radio acting as the WAP to a client upon actuation of a remote switch connected with one of the discrete electrical inputs of the first one of the modules.

14. The method of claim 11, further comprising automatically connecting the wireless radios of each module with the distinct wireless network of the aircraft server.

15. The method of claim 11, further comprising dynamically configuring another one of the wireless radios of the modules to be the new WAP and configuring the wireless radios of the remaining modules to connect to the new WAP as clients, upon detection of a failure of the WAP.

16. A method for wirelessly detecting a status of a plurality of components within a vehicle using a single connection, comprising:

receiving a status information from a plurality of modules, each of which is associated with a component of the same type;

wherein each of the modules comprises a wireless radio and two discrete electrical inputs;

switching a configuration of the wireless radio of a first one of the modules from a client to a wireless access point (WAP);

automatically configuring the wireless radios of the remaining ones of the modules to connect with the WAP as clients, by using a processor and a set of instructions to dynamically configure each wireless radio; and dynamically configuring one of the modules to be the WAP when a distinct wireless network of an aircraft server is not detected.

17. The method of claim 11, wherein the component is an overhead bin, and the plurality of modules each comprise a device for monitoring and reporting a status of the overhead bin, and wherein each of the modules is disposed within an overhead bin.

18. The method of claim 11, wherein the component is a service cart.

* * * * *